3,158,598
N-ARYLCARBAMYL-GLUCOSAMINES

Charles Morel, Arlesheim, Basel-Land, Switzerland, assignor to Geigy Chemical Corporation, Ardsley, N.Y., a corporation of Delaware
No Drawing. Filed Feb. 25, 1963, Ser. No. 260,877
Claims priority, application Switzerland, June 21, 1960, 7,017/60
4 Claims. (Cl. 260—211.5)

This application is a continuation-in-part of my copending application Serial No. 118,242, filed June 20, 1961, now abandoned.

The present invention relates to new derivatives of glucosamine and more particularly to new N-arylcarbamyl-glucosamines which have valuable pharmacological properties.

The novel compounds are characterized by a tetrahydroimidazole moiety fused with a D-glucopyrano moiety. The nitrogen atom in 3-position of the tetrahydroimidazole moiety is substituted by a phenyl group which bears in turn substituents as defined below; the carbon atom in 2-position of the tetrahydroimidazole moiety is substituted with either oxygen or sulfur.

Hitherto, phenylureas substituted with 1-desoxy sugar alcohol radicals such as the sorbityl radical and cyclic urethanes thereof have been used as herbicidal compositions, as insecticides, solvents, agents for supplying re-wetting properties to wet strength resins in the paper industry, and as depressants of the surface tension of water, foam, stabilizers, and detergents. The cyclic sorbityl-urethanes have also been recommended in agriculture on account of their anti-bacterial systemic activity and fungicidal activity coupled with their lack of phytotoxicity.

It has now been discovered that, surprisingly, the above-mentioned compounds, which are distinguished by the above-mentioned moiety of the formula

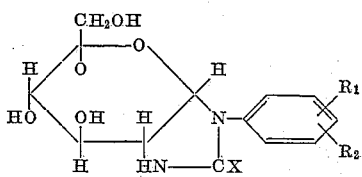

from the known cyclic compounds which possess sorbityl-urethane ring structures as follows:

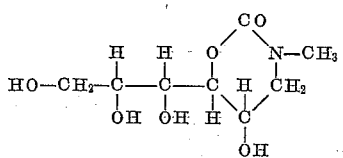

and/or

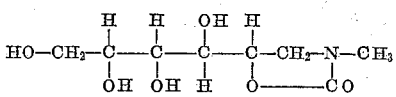

in that the novel compounds, and more particularly a D-glucosyl radical, of the formula

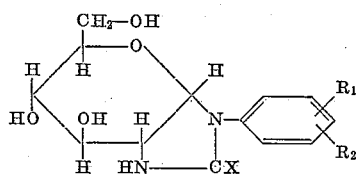   (I)

in which $R_1$ represents a member selected from the group consisting of halogen, lower alkyl, lower alkoxy, trifluoromethyl and nitro groups, $R_2$ represents a member selected from the group consisting of hydrogen, halogen, lower alkyl and lower alkoxy groups, and X represents a member selected from the group consisting of oxygen and sulfur, possess antiphlogistic, antipyretic and serotonin-antagonistic activity and are therapeutically useful for the treatment of inflammations of the respiratory system on oral or parenteral administration.

The compounds of Formula I are obtained by (a) Reacting α- or β-1,3,4,6-tetra-acetyl-D-pyranoglucosamine with a compound of the general formula

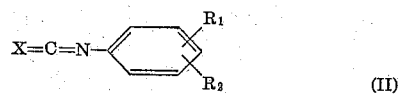   (II)

wherein $R_1$, $R_2$ and X have the meanings given above, (b) Converting the reaction product of the formula

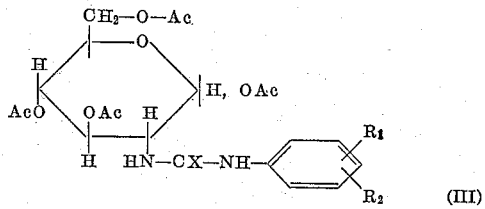   (III)

wherein Ac is the acetyl radical and $R_1$, $R_2$ and X have the meanings given above, by treatment with ammonia in a lower alkanol, into the corresponding compound of the formula

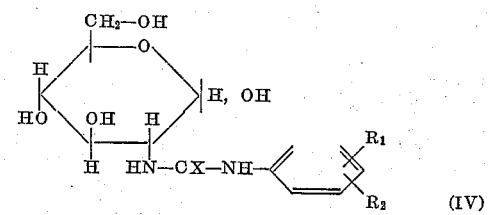   (IV)

wherein $R_1$, $R_2$ and X have the meanings given above, and (c) Subjecting the compounds of Formula IV, preferably in the reaction mixture resulting from step (b) above, to ring closing conditions, for example, heating in water, in an aqueous-organic acid such as, e.g., 20% acetic acid or in an organic acid such as, e.g., glacial acetic acid or formic acid, or treating with a dilute mineral acid in the cold or, also, while heating preferably to about 80° to 95° C.

In the compounds of the Formula I, $R_1$ is, for example, chlorine, fluorine, bromine, the nitro, trifluoromethyl, methyl, ethyl, n-propyl, isopropyl, n-butyl, isobutyl, tertiary butyl, n-amyl, isoamyl, diethylmethyl, tertiary amyl, methoxy, ethoxy, n-propoxy, isopropoxy, n-butoxy, isobutoxy, n-amyloxy or isoamyloxy group. $R_2$ is, for example, hydrogen or one of the substituents given for $R_1$ with the exception of the nitro group and the trifluoromethyl group.

Of particular value are compounds wherein $R_1$ is chlorine, the methyl group or the methoxy group, $R_2$ is hydrogen, chlorine or the methyl group, and X is sulfur.

The following examples further illustrate the preparation of compounds of Formula I as well as of compounds of Formula IV. Parts are given as parts by weight; their relationship to parts by volume is at that of grams to cubic centimetres. The temperatures are in degrees centigrade.

EXAMPLE 1

(a) 3.6 parts of β-1,3,4,6-tetra-acetyl-D-pyranoglucosamine (Berichte 64B, 975 (1931)) and 2.1 parts of 3,4-dichlorophenyl isocyanate in 70 parts by volume of anhydrous benzene are boiled under reflux for 2 hours while excluding moisture. After cooling, the β-1,3,4,6-tetra-acetyl-N-(3,4-dichlorophenyl-carbamoyl)-D-pyranoglucosamine is filtered off, washed with benzene and recrystallized from alcohol. M.P. 190–191°, $[\alpha]_D^{24°}$ +36.8°, c.=1.02 in dimethyl formamide.

(b) 5 parts of the above product are dissolved in 50 parts by volume of anhydrous methanol and, at 0°, 100 parts of ammonia in unhydrous methanol are added. The reaction solution is left to stand for 30 minutes at 0° and then for 3 hours at room temperature, whereupon it is evaporated to dryness in vacuo. The residue is recrystallized from ethanol whereupon N-(3,4-dichlorophenyl-carbamoyl)-D-glucosamine is obtained; M.P. 171–172°, $[\alpha]_D^{22°}$ +32.4°, c.=1 in dimethyl formamide.

(c) 9.5 parts of the product obtained according to (b) and 100 parts by volume of 20% acetic acid are heated for 30 minutes in a boiling water bath and the mixture is filtered, while still hot, with charcoal. The filtrate is left to crystallize, the 2-oxo-3-(3',4'-dichlorophenyl)-4,5-D-glucopyrano-tetrahydro-imidazole obtained is filtered off and recrystallized from alcohol, M.P. 206–207°, $[\alpha]_D^{24°}$ +148.7°, c.=1.02 in dimethyl formamide.

EXAMPLE 2

(a) 15 parts of β-1,3,4,6-tetra-acetyl-D-pyranoglucosamine in 250 parts by volume of anhydrous benzene and 7.8 parts of 3,4-dimethyl phenyl mustard oil are boiled under reflux for 2 hours while excluding moisture. Petroleum ether is then carefully added to the reaction solution until it is just about to become cloudy whereupon the product is left to crystallize. Recrystallized from ethanol, the β-1,3,4,6-tetra-acetyl-N-(3,4-dimethylphenyl-thiocarbamoyl)-D-pyranoglucosamine melts at 157–158°, $[\alpha]_D^{25°}$ +44.9°, c.=1 in dimethyl formamide.

(b) 12 parts of the produce obtained according to (a) are dissolved in 50 parts by volume of anhydrous methanol and, at 0°, 400 parts by volume of a solution, saturated at 0°, of ammonia in anhydrous methanol are added. The reaction solution is left for 2 hours at 0° and then for 4 hours at room temperature and afterwards evaporated to dryness in vacuo. The residue is dissolved as far as possible with 30 parts of hot water and, after filtering, the aqueous solution is left to crystallize. The N-(3,4-dimethylphenylthiocarbamoyl)-D-glucosamine melts at 188–190°, $[\alpha]_D^{26°}$ +6.3°, c.=1 in dimethyl formamide.

(c) 2 parts of the product obtained according to (b) and 15 parts by volume of 20% acetic acid are heated for 30 minutes in a boiling water bath. After cooling, the precipitate is filtered off and recrystallized from water. The 2-thiono-3-(3',4'-dimethylphenyl)-4,5-D-glucopyrano-tetrahydro-imidazole so obtained melts at 211–212°, $[\alpha]_D^{24°}$ +80°, c.=1 in dimethyl formamide.

The following compounds, for example, are also obtained analogously to the above examples.

Table 1

Intermediates of Formula III (limited to β-compounds):

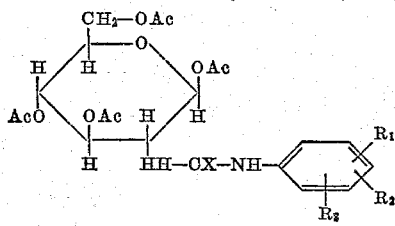

| Expl. No. | $-\langle R_1,R_2,R_3 \rangle$ | X | M.P., degrees | When crystallized from— | T (° C.) | $[\alpha]_D^T$ (degrees) | c. in DMF* |
|---|---|---|---|---|---|---|---|
| 3a | Cl, Cl (2,4) | S | 134–135 | Ether | 24 | +10.9 | 1.05 |
| 4a | Cl | O | 209–210 | Ethanol | 24 | +38.4 | 1.02 |
| 5a | Cl | S | 160–161 | Methanol | 23 | +25.5 | 1 |
| 6a | NO₂ | O | 220–222 | Ethanol | 24 | +40.9 | 0.98 |
| 7a | CH₃ | O | 220–201 | do | 24 | +38.0 | 1.03 |
| 8a | CH₃ | S | 158–159 | Methanol | 24 | +35.6 | 1.01 |
| 9a | OCH₃ | O | 203–204 | Ethanol | 25 | +35.2 | 1.01 |
| 10b | OCH₃ | S | 139–141 | do | 24 | +33.7 | 0.98 |
| 11b | Cl | O | 190–191 | do | 24 | +37.5 | 1.08 |

See footnote at end of table.

Table I—Continued

| Expl. No. | Aryl (R₁, R₂, R₃) | X | M.P., degrees | When crystallized from— | T (°C.) | $[\alpha]_D^T$ (degrees) | c. in DMF* |
|---|---|---|---|---|---|---|---|
| 12b | 4-Cl-C₆H₄ | S | 136–137 | ....do.... | 25 | +11.1 | 1 |
| 13b | 3,4-(CH₃)₂-C₆H₃ | O | 210–211 | ....do.... | 25 | +39.1 | 1 |
| 14b | 3,4-Cl₂-C₆H₃ | O | 202–203 | ....do.... | 25 | +37.2 | 1 |
| 15b | 2,4-Cl₂-C₆H₃ | S | 152–153 | Ether | 24 | +25.8 | 0.98 |

*DMF = dimethyl formamide.

Table II

Compounds of Formula IV:

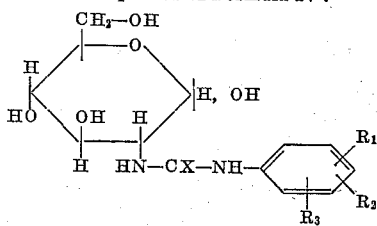

| Expl. No. | Aryl (R₁, R₂, R₃) | X | M.P., degrees | When crystallized from— | T (°C.) | $[\alpha]_D^T$ (degrees) | c. in DMF |
|---|---|---|---|---|---|---|---|
| 3b | 3,4-Cl₂-C₆H₃ | S | 180–182 | Ethanol | 23 | −7.3 | 1.01 |
| 4b | 4-Cl-C₆H₄ | O | 171–173 | ....do.... | 24 | +88.1 | 0.97 |
| 5b | 4-Cl-C₆H₄ | S | 144–147 | Ethanol/ether | 22 | +30 | ¹ 1.08 |
| 6b | 4-NO₂-C₆H₄ | O | 153–155 | Ethanol | 26 | +17.7 | ² 1 |
| 7b | 4-CH₃-C₆H₄ | O | 179–181 | Ethanol/water | 23 | +45.2 | 1.03 |
| 8b | 4-CH₃-C₆H₄ | S | 154–157 | Ethanol | 22 | +10.2 | 1.01 |
| 9b | 4-OCH₃-C₆H₄ | O | 135–138 | Ethanol/ether | 23 | +13.1 | 1.01 |
| 10b | 3-Cl-C₆H₄ | O | 189–192 | Ethanol/water | 23 | +55.8 | 0.99 |
| 11b | 4-Cl-C₆H₄ | S | 204–206 | Water | 24 | −21.6 | 1.07 |

See footnotes at end of table.

Table II—Continued

| Expl. No. | R₁/R₂/R₃ substituents | X | M.P., degrees | When crystallized from— | T (° C.) | $[\alpha]_D^T$ (degrees) | c. in DMF |
|---|---|---|---|---|---|---|---|
| 12b | 2-CH₃, 3-CH₃ | O | 184–186 | Ethanol | 25 | +47.6 | 1.1 |
| 13b | 2-Cl, 4-Cl | O | 181–184 | ___do___ | 25 | +47.2 | 1.06 |
| 14b | 2-Cl, 4-Cl | S | 192–194 | Ethanol/water | 27 | −13.5 | 1.01 |

¹ In ethanol.
² DMF/H₂O 9:1.

Table III

Compounds of Formula I:

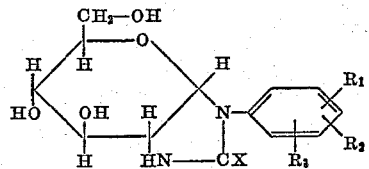

| Expl. No. | R₁/R₂/R₃ substituents | X | M.P., degrees | When crystallized from— | T (° C.) | $[\alpha]_D^T$ (degrees) | c. in DMF |
|---|---|---|---|---|---|---|---|
| 3c | 2-Cl, 4-Cl | S | 185–186 | Water | 24 | +72.1 | 1.09 |
| 4c | 4-Cl | O | 221–222 | Ethanol | 24 | +145.9 | 1.01 |
| 5c | 4-Cl | S | 232–233 | Ethanol/water | 24 | +80.1 | 1 |
| 6c | 4-NO₂ | O | 233–234 | Water | 24 | +281.2 | 1 |
| 7c | 4-CH₃ | O | 221–222 | Ethanol | 24 | 126.5 | 1.04 |
| 8c | 4-CH₃ | S | 237–238 | Water | 24 | +79.5 | 0.88 |
| 9c | 4-OCH₃ | O | 201–202 | ___do___ | 24 | +117.1 | 1 |
| 10c | 4-OCH₃ | S | 235–236 | Ethanol/water | 24 | +79.6 | 1 |
| 11c | 3-Cl | O | 260–261 | Ethanol | 24 | +87.1 | 1.01 |
| 12c | 3-Cl | S | 215–216 | Water | 25 | +119.7 | 1 |

Table III—Continued

| Expl. No. | ![R1/R2/R3 phenyl] | X | M.P., degrees | When crystallized from— | T (° C.) | $[\alpha]_D^T$ (degrees) | c. in DMF* |
|---|---|---|---|---|---|---|---|
| 13c | CH₃, CH₃ | O | 166–167 | ___do___ | 25 | +124.6 | 1 |
| 14c | Cl, Cl | O | 107–108 | ___do___ | 25 | +146.2 | 1.04 |
| 15c | Cl, Cl | S | 191–192 | ___do___ | 25 | +66.2 | 1 |

What I claim is:

1. A compound of the formula

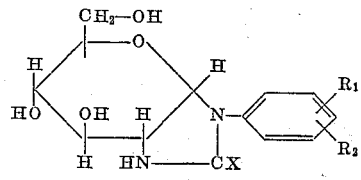

in which
R₁ represents a member selected from the group consisting of halogen, lower alkyl, lower alkoxy, trifluoromethyl and nitro,
R₂ represents a member selected from the group consisting of hydrogen, halogen, lower alkyl and lower alkoxy, and
X represents a member selected from the group consisting of oxygen and sulfur.

2. 2-oxo-3-(3′,4′-dichlorophenyl) - 4,5-D-glucopyrano-tetrahydroimidazole.

3. 2-thiono-3-(3′,4′-dichlorophenyl)-4,5 - D - glucopyrano-tetrahydroimidazole.

4. 2-thiono-3-(3′,4′-dimethylphenyl) - 4,5 - D-glucopyrano-tetrahydroimidazole.

References Cited in the file of this patent
UNITED STATES PATENTS
2,891,944    Boettner _____ June 23, 1959